(12) United States Patent
Khmelev et al.

(10) Patent No.: US 12,517,989 B1
(45) Date of Patent: Jan. 6, 2026

(54) SYSTEM AND METHOD FOR 3D PRINT VERIFICATION USING NFTS

(71) Applicant: United Services Automobile Association (USAA), San Antonio, TX (US)

(72) Inventors: Yevgeniy Viatcheslavovich Khmelev, San Antonio, TX (US); Gregory Meyer, San Antonio, TX (US); Seth E. Ethington, McKinney, TX (US); Benjamin D. Ethington, Savannah, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 369 days.

(21) Appl. No.: 18/085,316

(22) Filed: Dec. 20, 2022

Related U.S. Application Data

(60) Provisional application No. 63/292,640, filed on Dec. 22, 2021.

(51) Int. Cl.
*G05B 19/4099* (2006.01)
*G06F 21/31* (2013.01)

(52) U.S. Cl.
CPC ......... *G06F 21/31* (2013.01); *G05B 19/4099* (2013.01)

(58) Field of Classification Search
CPC .......................... G06F 21/31; G05B 19/4099
See application file for complete search history.

(56) References Cited

U.S. PATENT DOCUMENTS

2022/0309491 A1\* 9/2022 Shapiro .................. G06F 21/64

\* cited by examiner

*Primary Examiner* — Gary Collins
(74) *Attorney, Agent, or Firm* — Fletcher Yoder, P.C.

(57) ABSTRACT

A three-dimensional (3D) printing system for printing 3D structures includes an extruder configured to layer material along a surface during a printing process. The 3D printing system also includes a processor configured to receive an identifier from a device associated with a user and receive a non-fungible token (NFT). The NFT includes a blueprint of a structure. The processor is also configured to query a blockchain to confirm the NFT is associated with the identifier and, in response to determining that the user owns the NFT, cause the extruder to print a physical structure based on the blueprint.

17 Claims, 4 Drawing Sheets

SYSTEM AND METHOD FOR 3D PRINT VERIFICATION USING NFTS

CROSS-REFERENCE TO RELATED APPLICATION

The present application claims benefit of and priority to U.S. Provisional Patent Application Ser. No. 63/292,640, titled "SYSTEM AND METHOD FOR 3D PRINT VERIFICATION USING NFTS," which was filed on Dec. 22, 2021, and which is herein incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statement are to be read in this light, and not as admission of prior art.

In recent years, three-dimensional (3D) printing has emerged as a construction and manufacturing technique. Large 3D printing devices may construct homes and other buildings in a quick, automatic, and repeatable manner. Building plans used by the 3D printing devices are often owned by a third party that sells licenses to use the building plans. However, in the digital age, it is now recognized that piracy and illegal use may be the source of large risks to such third parties. Further, it is now recognized that it would be desirable to have a system and method for verifying authorization to use building plans in relation to a 3D printing operation.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a three-dimensional (3D) printing system for printing 3D structures includes an extruder configured to layer material along a surface during a printing process. The 3D printing system also includes a processor configured to receive an identifier from a device and receive a non-fungible token (NFT). The NFT includes a blueprint of a structure. The processor is also configured to query a blockchain to confirm the NFT has an association with the identifier that indicates the device is authorized to use the blueprint and, in response to determining that the device is authorized to use the blueprint, cause the extruder to print a physical structure based on the blueprint.

In another embodiment, a method includes receiving, via a controller, an identifier from a device. The device is associated with a 3D printing apparatus, and the identifier comprises data authorizing a 3D printing operation. The method also includes, receiving, via the controller, a non-fungible token (NFT), wherein the NFT includes a blueprint of a structure, querying, via the controller, a blockchain to confirm the NFT has an association with the identifier that indicates the device is authorized to use the blueprint, and, in response to determining that the device is authorized to use the blueprint, causing, via the controller, the 3D printing apparatus to print a physical structure based on the blueprint.

In yet another embodiment, a tangible, non-transitory, computer-readable medium, comprising computer-readable instructions that, when executed by one or more processors, cause the one or more processors to receive an identifier from a device. The device is associated with a 3D printing apparatus, and the identifier includes data authorizing a 3D printing operation. The processors may also receive a non-fungible token (NFT), wherein the NFT includes a blueprint of a structure, query a blockchain to confirm the NFT has an association with the identifier that indicates the device is authorized to use the blueprint, and, in response to determining that the device is authorized to use the blueprint, cause the 3D printing apparatus to print a physical structure based on the blueprint.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
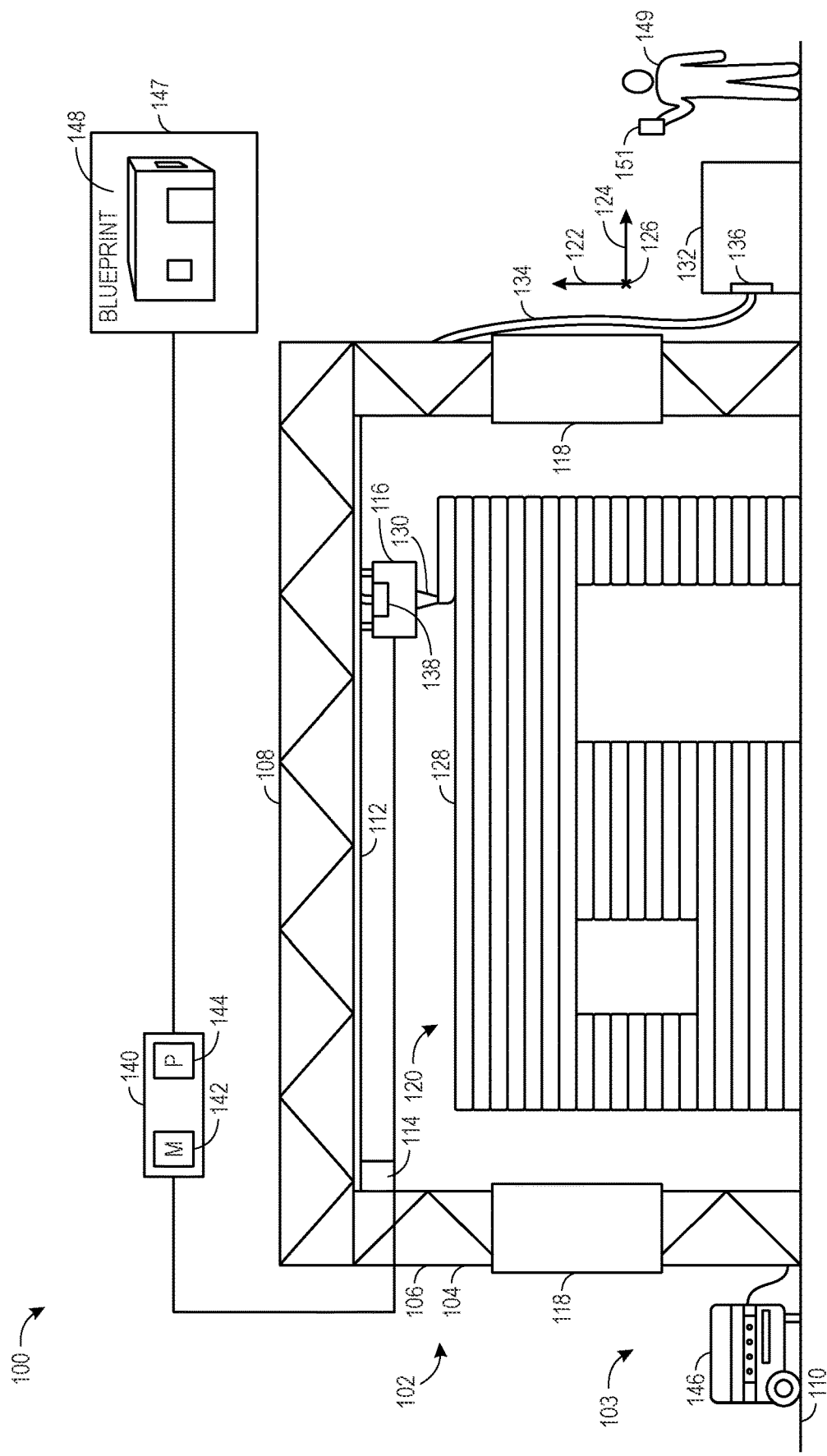
FIG. 1 is a diagram illustrating a three-dimensional (3D) printing system for 3D printing structures, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Alongside traditional construction, new methods for manufacturing buildings and other structures are emerging. One such method is three-dimensional (3D) printing. Large 3D printing apparatuses may layer construction materials (e.g., concrete, insulation, sealant, metal) to automatically construct a building essentially without human intervention. A 3D printing apparatus may construct a building based on a digital blueprint. In fact, a digital blueprint may include instructions for 3D printing a structure defined by the digital blueprint. Digital blueprints may be the intellectual property of the architect that drafted the blueprints, a builder, or another owner. Consequently, in order to comply with intellectual property laws, a 3D printing apparatus in accordance with present embodiments may verify whether a user attempting to construct a building is authorized to utilize a particular digital blueprint.

Non-fungibles tokens (NFTs) have emerged as a type of digital media that may be associated with an owner. NFTs may be any piece of digital media (e.g., a two-dimensional image, a 3D model) and are associated with an owner via a blockchain, which is an immutable digital record (e.g., ledger) that is maintained on numerous computers in a network (peer-to-peer network). Once set, the blockchain may be queried to verify that the associated piece of digital media belongs to the owner and updated to show new ownership and associated transactions. Accordingly, NFTs and blockchains may be useful for verifying whether a user is authorized to utilize a digital blueprint for a 3D printing operation. The present embodiments are directed toward a system and method for verifying whether a user is authorized to utilize a digital building plan or blueprint by querying a blockchain to determine whether a user-owned identifier is associated with an NFT corresponding with the digital building plan (e.g., an NFT of the digital building plan).

FIG. 1 is a diagram illustrating a three-dimensional (3D) printing system 100 for 3D printing structures. The 3D printing system 100 may include a 3D printing apparatus 102 configured to 3D print a structure at a location 103. The 3D printing apparatus 102 may include a frame 104 configured to structurally support and position components of the 3D printing apparatus 102. The frame 104 may be composed of a plurality of structural elements (e.g., trusses, I-beams, pipes, planks) made up of one or more materials (e.g., steel, aluminum, wood, plastic). The frame may include vertical elements 106 and horizontal elements 108. The vertical elements 106 may extend crosswise from a surface 110, while the horizontal elements 108 may extend between the vertical elements 106 to connect the frame 104 as a continuous structure. In addition to connecting the vertical elements 106, the horizontal elements 108 may attach to conveyance system 112 (e.g., a belt system). One or more motors 114 are configured to position an extruder 116 along the horizontal members 108 via the conveyance system 112. Additionally, a plurality of actuators 118 may adjust a height of the vertical elements 106. The actuators 118 may be hydraulic cylinders, motor and belt systems, worm gear systems, or the like. The conveyance system 112, the one or more motors 114, and the actuators 118 may work in conjunction to position the extruder 116 within a volume 120 defined by the frame 104. The volume 120 extends along a vertical axis or direction 122, a horizontal axis or direction 124, and an additional horizontal axis or direction 126. The conveyance system 112 and the one or more motors 114 may position the extruder 116 along the horizontal direction 124 and the additional horizontal direction 126. The actuators 118 may position the extruder 116 along the vertical direction 122. In certain embodiments, the actuators 118 may manipulate the length of the vertical members 106. In other embodiments, the actuators 118 may manipulate the position of the horizontal members 108 along the vertical members 106 in the direction 122. Further, in other embodiments, different techniques and components may be employed to position the extruder 116, as would be understood by one of ordinary skill in the art.

The extruder 116 is configured to layer material along the surface 110 and about the volume 120 to form a structure 128 (e.g., a printable structure, a physical structure) during a printing process. The structure 128 may be a residential home, an industrial space, a hospital, a road, a sidewalk, a foundation, or any kind of building or infrastructure. The extruder 116 may include a nozzle 130 configured to deposit material to form the structure 128. The extruder 116 may receive material from a material storage unit 132 via a conduit or tube 134. The material storage unit may contain one or more material storage compartments as well as a pump 136 and other components for maintaining and transporting materials. For example, the material storage unit 132 may include compartments containing concrete, asphalt, tar, clay, plastic, sealant, insulation, metal, and other materials for use in construction. The pump 136 may transport the materials along the tube 134 to the extruder 116. In certain embodiments, the extruder 116 may include a heating element 138 for heating certain materials (e.g., plastic) into a malleable state (e.g., after potential cooling during transition from a heated source). During a construction operation, the extruder 116 may deposit material received from the material storage unit 132 via the nozzle 130 to construct the structure 128.

The 3D printing apparatus 102 may be transported to different locations to manufacture structures. For example, in one embodiment, a user may disassemble components (e.g., the vertical elements 106, the horizontal elements 108, the extruder 116) of the 3D printing apparatus 102 and place the components into a vehicle to be transported to an additional manufacturing site. The components may be reassembled into the 3D printing apparatus 102 at the additional manufacturing site, where the 3D printing apparatus 102 may manufacture additional structures. In another embodiment, the 3D printing apparatus 102 may include wheels that may be used to transport the 3D printing apparatus to additional locations.

The 3D printing system 100 may include a controller 140. The controller 140 may include memory 142 and a processor 144. The processor 144 may be any type of computer processor or microprocessor capable of executing computer-executable code. The processor 144 may also include multiple processors that may perform the operations described below. The memory 142 may be any suitable article of manufacture that can serve as media to store processor-executable code, data, or the like. These articles of manufacture may represent computer-readable media (e.g., any suitable form of memory or storage) that may store the processor-executable code used by the processor 144 to perform the presently disclosed techniques. The memory 142 may also be used to store data (e.g., identification data, data related to construction metrics, sensor measurements, printing characteristics, site measures, calculations, a lookup table, user inputs, and so forth), various software applications for analyzing the data, and the like. The memory 142 may represent non-transitory computer-readable media (e.g., any suitable form of memory or storage) that may store the processor-executable code used by the processor 144 to perform various techniques described herein. It should be noted that non-transitory merely indicates that the media is tangible and not a signal.

The controller 140 may be communicatively coupled to the one or more motors 114, the extruder 116, the actuators 118, the pump 136, or the any other controllable part of the 3D printing system 100. The controller 140 may control operation of the 3D printing apparatus 102. In certain embodiments, the controller 140 may be located in the immediate vicinity of the 3D printing system 100 (e.g., the location 103). In other embodiments, the controller 140 may be remote from the 3D printing system 100. In either embodiment, the controller 140 may communicatively couple to the components of the 3D printing apparatus 102 via a Wi-Fi network, a 4G network, a 4G LTE network, a 5G network, a Bluetooth network, a near field communication (NFC) network, a local area network (LAN), or any other means of data communication. The controller 140 and the 3D printing apparatus 102 may be powered by a generator 146 or another source of electricity.

The 3D printing apparatus 102 may construct the structure 128 based on a non-fungible token (NFT) 147 including or incorporating a blueprint 148 (e.g., a digital building plan). The blueprint 148 may be a two-dimensional (2D) or 3D digital representation of the structure 128 and may include instructions for 3D printing of the structure 128. Specifically, the blueprint 148 may include a visual representation of the structure 128 that further includes construction information such as dimensions, materials, estimated cost, compatible 3D printer models, compatible environmental conditions, design variations based on lot size, climate preferences or requirements, topography, and/or other data pertinent to construction. The controller 140 may utilize the blueprint 148 to control the 3D printing apparatus 102 to construct the structure 128 depicted in the blueprint 148.

The controller 140 may also be configured to verify that a user 149 (e.g., person, individual, entity, corporation) or equipment (e.g., a computer, controller, 3D printer) is properly associated with the blueprint 148 for purposes of authorization (e.g., to confirm the user 149 or equipment is authorized to construct the structure 128). For example, the NFT 147 may belong to an owner. The owner may be an architect who designed the blueprint 148, a building company that owns the NFT 147, or another entity. The owner may license the design for use and this licensing may be stored on the blockchain. To verify whether the user 149 is authorized to utilize the blueprint 148, the controller 140 may receive an identifier from the user 149 and utilize it with data contained in the NFT 147. The controller 140 may access the internet to query a blockchain associated with the NFT 147 to determine data regarding the NFT 147 (e.g., ownership data, assignment data, data contained in the NFT 147). The controller may then cross-reference data contained in the NFT 147 with data contained in the identifier. The identifier may indicate that the user 149 is the owner of the NFT 147, that the user 149 is not the owner but has permission from the owner to use the blueprint 148, or that the user 149 is otherwise authorized to use the blueprint 148.

The 3D printing system 100 may verify that the user 149 is authorized to construct the structure 128 in one or more of multiple ways. For example, the identifier may comprise an encrypted password. The controller 140 may compare the password of the identifier with a confirmation password contained in the NFT 147. If the password matches the confirmation password, the controller 140 allows the 3D printing apparatus 102 to print the structure 128 based on the blueprint 148. If the password does not match the confirmation password, the controller 140 prevents the 3D printing apparatus 102 from printing the structure 128. In a similar example, the identifier may comprise a biometric input (e.g., a fingerprint scan, a retinal scan, a DNA sample). If the biometric input matches a biometric input of a list of authorized biometric inputs associated with the NFT, the controller 140 allows the 3D printing apparatus 102 to print the structure 128 based on the blueprint 148. If the biometric input does not match the biometric input of the NFT, the controller 140 prevents the 3D printing apparatus 102 from printing the structure 128. In another example, the identifier may be an image of a form of identification, such as a government-issued identification (ID) card or ID number. The user 149 may create an image of the ID card using a device 151 (e.g., a camera, a cell phone) or input the ID number using the device 151. The device 151 may send the image or the ID number to the controller 140. The controller 140 may verify that the ID card belongs to the owner of the NFT 147 and allow the 3D printing apparatus 102 to print the structure 128. In yet another example, the identifier may be an additional NFT comprising data indicating a license to use the blueprint 148. The controller 140 may query a blockchain associated with the additional NFT to determine whether the user 149 is the owner. The password, ID card image, ID number, or NFT information may be sent to the controller 140 using the device 151. A method for authorizing and printing the structure 128 is detailed below. It should be understood that such methods may also be applied to equipment (e.g., based on equipment identifiers and authorizations) and not just individuals.

Figure 2:
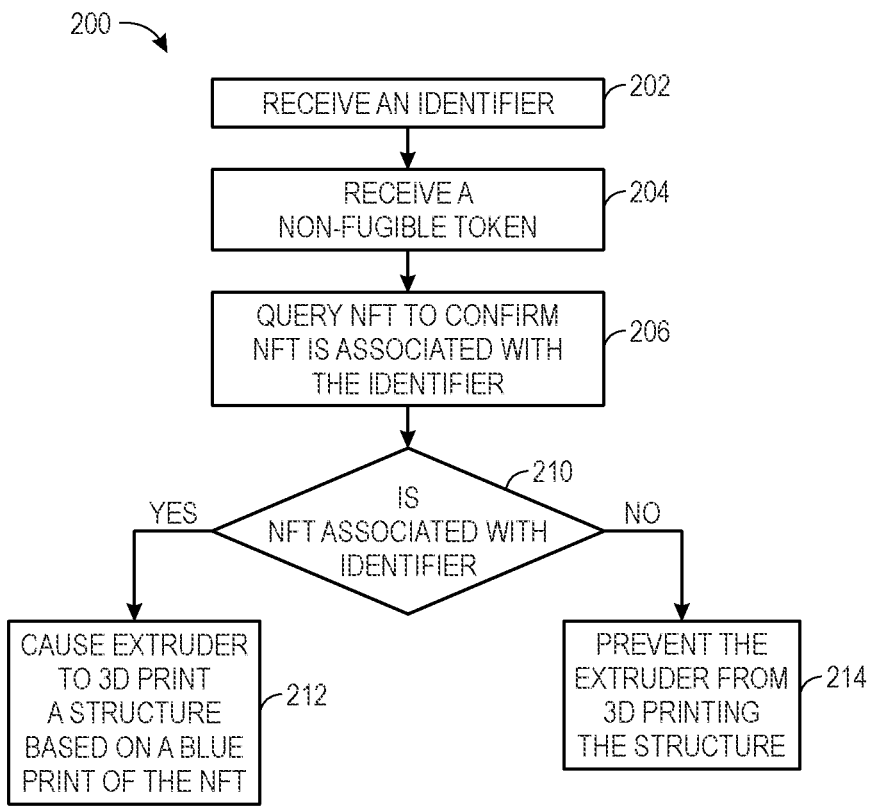
FIG. 2 is a flow chart illustrating a method for verifying a user is authorized for a 3D printing operation, in accordance with embodiments described herein.

FIG. 2 is a flow chart illustrating a method 200 for verifying authorization for a 3D printing operation. Although the following description of the method 200 is described in a particular order, it should be noted that the method 200 is not limited to the depicted order; and, instead, the method 200 may be performed in any suitable order. This method 200 (or algorithm) may be performed by the controller 140, in accordance with present embodiments.

At block 202, the controller 140 receives an identifier. The identifier may be a piece of data indicating that the user 149 or equipment is authorized to 3D print the structure 128, or another suitable structure, based on the blueprint 148 or another blueprint or building plan. The identifier may comprise data that indicates that the user 149 is either the owner of the NFT 147 containing the blueprint 148, or is authorized by the owner to 3D print a structure based on the blueprint 148. In another embodiment, the identifier may indicate authorized equipment. As previously discussed, the identifier may be a password used to verify authorization. For example, verifying that the user 149 owns the NFT 147 or has permission to use the blueprint 148. The identifier may also be an ID card or ID number indicating that the user 149 owns the NFT 147. Additionally, the identifier may be another NFT or an address for an additional NFT comprising data indicating a license to use the blueprint 148. The controller 140 may receive the identifier from the device 151 or another suitable device. The controller 140 may receive the identifier before a printing operation begins, or at a step during the printing operation.

At block 204, the controller 140 receives the NFT 147. The NFT 147 may be received from a software wallet, a hardware wallet, a file system, or another appropriate NFT storage location. In certain embodiments, the controller 140 may receive an address associated with the NFT 147 and retrieve or otherwise access the NFT 147 using the address.

In another embodiment, the controller 140 may receive data contained in the NFT 147 (e.g., ownership data, history data) directly. The NFT 147 may include a digital blueprint (e.g., a set of building instructions for a 3D printer) for 3D printing a structure, such as a building.

At block 206, the controller 140 queries the NFT 147 to confirm whether the NFT 147 includes data associated with the identifier. In one embodiment, the controller 140 may query a blockchain associated with the NFT 147 to determine an identity of the owner of the NFT 147. In another embodiment, the controller 140 may analyze data contained in the NFT 147 to identify the existence of a password and a corresponding confirmation password for authorization, the existence of one or more additional NFTs for authorization (e.g., via an address for the one or more additional NFTs), or another form of proof of authorization.

At block 210, the controller 140 determines whether the NFT 147 is associated with the identifier in a manner that confirms authorization. For example, the controller 140 may compare the password of the identifier to the confirmation password of the NFT 147. If the password and confirmation password match, the controller 140 authorizes the user 149 or equipment to utilize the blueprint 148 for a 3D printing operation. That is, the blueprint 148 may be utilized to guide or direct the 3D printing operation. Otherwise, the controller 140 does not authorize the user 149 or equipment to utilize the blueprint 148. It should be noted that a similar operation may include checking (e.g., via a blockchain) to confirm a physical site location (e.g., location 103 as detected by a sensing mechanism, such as GPS) for 3D printing a structure has been properly associated with the NFT 147 (e.g., the NFT 147 has been approved for printing at the specific physical location as indicated on the blockchain). In another example, the controller 140 may compare the identity of the owner found in the NFT 147 with an identity of the user 149 or equipment associated with the ID card or ID number of the identifier. The controller may query a database (e.g., a census data database) to find the identity associated with the ID number. In an embodiment, if the identity of the owner found in the NFT 147 matches the identity of the user 149 found in the identifier, the controller 140 authorizes the user 149 to utilize the blueprint 148. Otherwise, the controller 140 does not authorize the user 149 to utilize the blueprint 148. In a further example, the controller 140 may compare the address for the additional NFT found in the NFT 147 with the address for the additional NFT found in the identifier, or query the blockchain associated with the additional NFT to determine whether the user owns the additional NFT. If the address for the additional NFT found in the NFT 147 and the address for the additional NFT found in the identifier match, the controller 140 authorizes the user 149 to utilize the blueprint 148. Otherwise, the controller 140 does not authorize the user 149 to utilize the blueprint 148. If the controller 140 authorizes the user 149 to utilize the blueprint 148, the method 200 proceeds to block 212. If the controller 140 does not authorize the user 149 to utilize the blueprint 148, the method 300 proceeds to block 214. It should be noted that the controller 140 may be representative of any of various different systems or computing devices (e.g., a centralized server or cloud-based processor). Indeed, in some embodiments, the controller 140 illustrated in FIG. 1 may require authorization from another separate controller before being allowed to process certain procedures associated with the blueprint 148.

At block 212, in response to determining that the user 149 or equipment is authorized to utilize the blueprint 148, the controller 140 causes the 3D printing apparatus 102 to print the structure 128 based on the blueprint 148 of the NFT 147. In one embodiment, the user 149 may have access to printing unlimited structures based on the blueprint 148. In other embodiments, the user 149 may be limited to printing a finite number of structures based on the blueprint 148. For example, the controller 140 may authorize the user 149 to print one structure based on the blueprint 148. After printing the structure 128 based on the blueprint 148, the controller 140 prevents the 3D printing apparatus 102 from printing another structure based on the blueprint 148. In certain embodiments, the user 149 may print more structures based on the blueprint 148 than the controller 140 authorizes. In this case, the controller 140 may cause the 3D printing apparatus 102 to print an indication of inauthenticity on the printed structure. The indication of inauthenticity may be an infill pattern, a mark on the exterior of the printed structure, or another discernable indicator that the structure is not authorized. Additionally, authorized structures may be manufactured with an indication of authenticity (e.g., an infill pattern, a mark on the exterior of the printed structure). In one embodiment, upon completion of a manufacturing operation based on the blueprint 148, an owner or designer of the NFT 147 may receive a royalty payment.

At block 214 in response to determining that the user 149 or equipment is not authorized to utilize the blueprint 148, the controller 140 prevents the 3D printing apparatus 102 from printing the structure 128 based on the blueprint 148 of the NFT 147. The controller 140 may prevent the 3D printing apparatus 102 from printing a structure based on the blueprint 148, prevent the 3D printing apparatus 102 from printing any structures for a period of time, or deactivate the 3D printing apparatus 102 altogether. In one embodiment, the controller 140 may cause the 3D printing apparatus 102 to manufacture a structure with no indication of authenticity. In another embodiment, the controller 140 may cause the 3D printing apparatus to manufacture a structure with an indication of inauthenticity. In yet another embodiment, the controller 140 may cause the 3D printer to manufacture a defective structure, a different structure than the structure 128 depicted in the blueprint 148, or the like.

Figure 3:
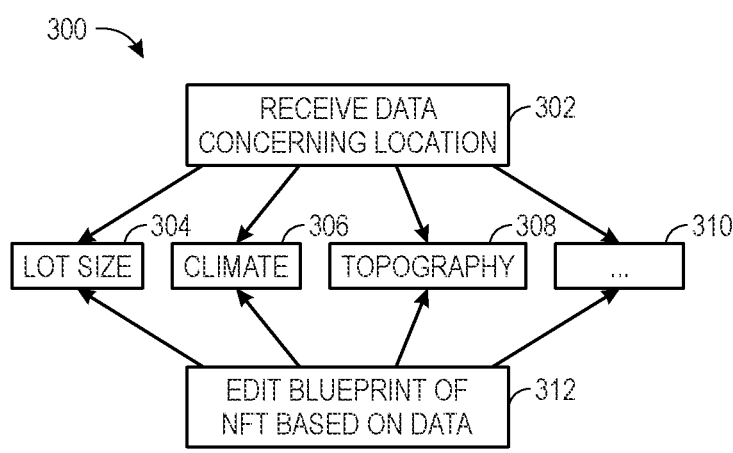
FIG. 3 is a flow chart illustrating a method for editing a non-fungible token (NFT) based on location-based data, in accordance with embodiments described herein.

FIG. 3 is a flow chart illustrating a method 300 for editing the NFT 147 based on location-based data. Although the following description of the method 300 is described in a particular order, it should be noted that the method 300 is not limited to the depicted order; and, instead, the method 300 may be performed in any suitable order. This method 300 (or algorithm) may be performed by the controller 140, in accordance with present embodiments.

At block 302, the controller 140 receives location-based data. The location-based data may comprise data describing attributes of a construction location (e.g., location 103). The location-based data may be received from a device (e.g., the device 151 or an internal sensing mechanism, such as a GPS) or retrieved from an external source. For example, the user 149 may send location-based data (e.g., property maps, climate data, soil data) to the controller 140 via the device 151. In another example, the controller 140 may search a public database or a private database for data concerning the location. The controller 140 may search city maps, urban planning diagrams, utilities records, and the like. The location-based data may also be collected by a user (e.g., a land surveyor, an owner, a construction worker). In one embodiment, the location-based data may be collected by a plurality of sensors of the 3D printing system 100. For example, the 3D printing apparatus 102 may include one or more cameras, thermocouples, gyroscopes, for collecting location-based data in real time.

At block 304, the controller 140 analyzes lot size data of the location-based data. The lot size data may be found in city maps and urban planning records. The lot size data may include data concerning the dimensions of the location, areas of the location upon which it is proper to build, and the like. The lot size data may also include building codes associated with the location. For example, the lot size data may include building height restrictions, anti-fire guidelines, material restriction, environmental guidelines, and the like.

At block 306 the controller 140 analyzes climate data of the location-based data. The climate data may be sourced from environmental reports or directly from sensors (e.g., essentially real-time weather conditions). The climate data may include data concerning average temperature of the location throughout a calendar year, minimum and maximum temperatures, humidity, extreme weather likelihood (e.g., hail, tornadoes, hurricanes, flooding), natural disaster likelihood (e.g., rockslides, avalanches, earthquakes, forest fires), and the like. Current and historical conditions may be relevant to printing quality and adjustments for the printing quality may be performed by techniques and systems in accordance with present embodiments. For example, if the weather is humid on a particular day or in a particular area (e.g., a location having a humid climate), adjustments to mixing parameters or heating parameters for printing material may be made to avoid consistency issues related to the level of humidity.

At block 308 the controller 140 analyzes topographical data of the location-based data. The topographical data may be found in city maps and urban planning records. In some embodiments, the topographical data may be directly measured with sensors or provided via input from a surveying program or a surveyor. The topographical data may include data concerning the topography of the location, tree locations, sewage and utility locations, and the like. In one embodiment, the topographical data may include terraforming recommendations. For example, the topographical data may include a recommendation to flatten a raised area to improve construction conditions. In another example, the topographical data may include a recommendation to fill in a lowered area.

At block 310 the controller 140 analyzes other forms of data of the location-based data. The other forms of data may include property value data, property tax data, wildlife and botanical data, user preference data, material cost data, and the like. The user preference data may be a set of preferences (e.g., larger area of structure, taller windows, porch, single story) input by the user 149 or collected from poll data. In one embodiment, the controller 140 may analyze neighborhood aesthetic data. The neighborhood aesthetic data may include architectural style data of nearby structures, color data of nearby structures, size data of nearby structures, homeowners association standards, and the like.

At block 312, the controller 140 edits the blueprint 148 of the NFT 147 based on the analysis of the location-based data. In some embodiments, the controller 140 edits the blueprint 148 based on a correlation between the location-based data and structural characteristics (e.g., building characteristics). In one embodiment, the controller 140 edits the dimensions of the blueprint 148 and placement of the structure 128 on the location 103 based on lot size data, as well as user preference data. For example, if the lot size data indicates that the location 103 is significantly larger than the structural footprint rendered in the blueprint 148 and the user preference data indicates a preference for a large house, the controller 140 may increase the size of the structure in the blueprint 148 compared to the original blueprint. In another embodiment, the controller 140 edits climate-sensitive aspects of the blueprint 148 (e.g., wall thickness, insulation thickness and placement, window size, building material) based on the climate data. In one example, if the climate data indicates that the structure 128 is built in an area with long, cold winters, the controller 140 edits the blueprint 148 to include thicker walls and more insulation than the original blueprint. In another example, the climate data may indicate that the location 103 experiences frequent earthquakes. In response, the controller edits the blueprint 148 to have a larger foundation than the original blueprint. In another embodiment, the controller 140 edits the structural elements of the blueprint 148 based on the topography data. For example, if the topography data indicates that the location 103 is inclined, the controller 140 edits the blueprint 148 to add structural elements for building on an inclined surface. All of this data may also be utilized in conjunction with insurance data to identify associated insurance costs. For example, a table of insurance data may be used to identify a premium estimate for a type of building to be printed. Likewise, adjustments and recommendations can be made to decrease insurance costs. For example, the controller 140 may recommend eliminating printing of a particular room of the blueprint 148 or addition of a roof type to encourage adjustments in cost of insurance.

Figure 4:
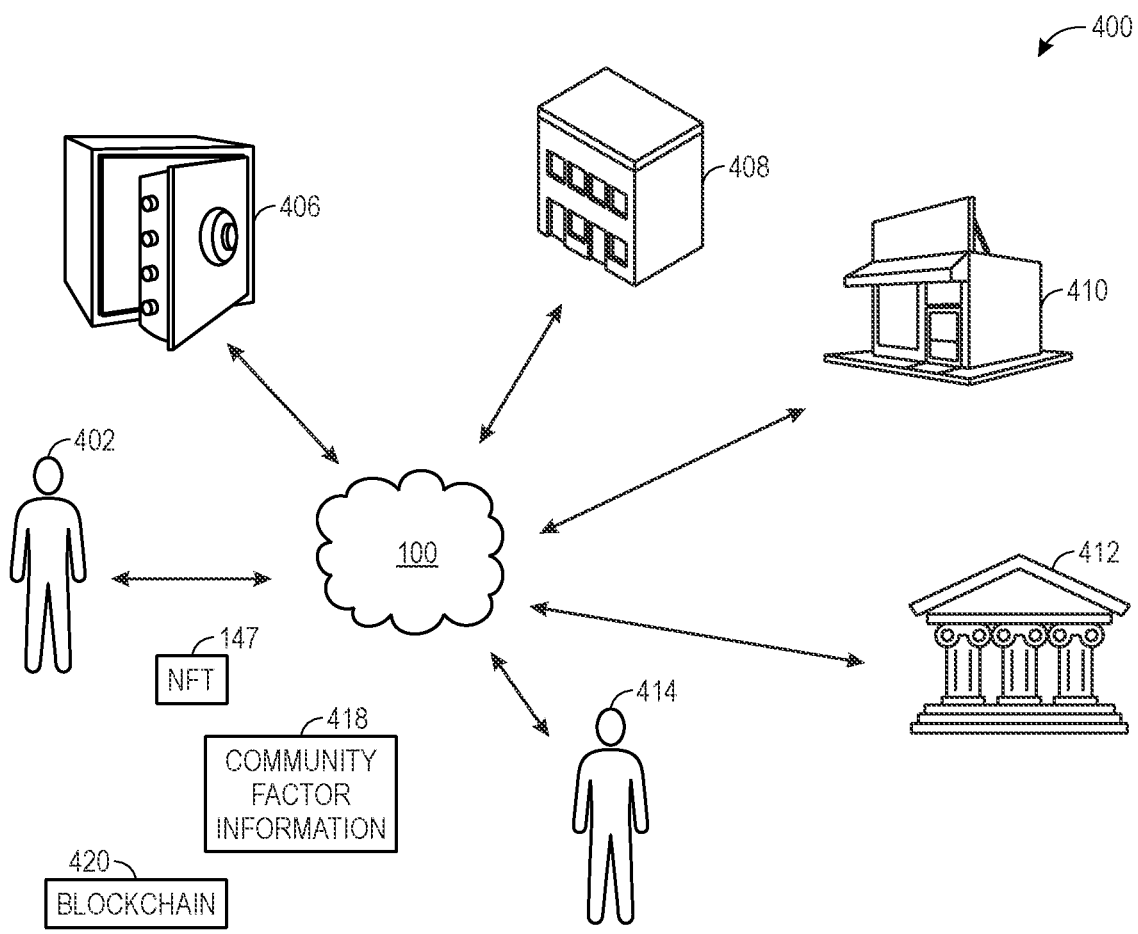
FIG. 4 is a schematic illustration of an environment in which a non-fungible token management system may operate, in accordance with an embodiment.

FIG. 4 illustrates an example environment 400 in which the system 100 may operate, in accordance with embodiments described herein. A user 402 can interact with and access the NFT management system 404 via a user device, such as a mobile device that is implemented as a computing device as provided herein. The system 100 may provide NFT management services to a large number of different organizations or individuals, and may act as a clearinghouse for various types of NFT transactions. For example, the NFT system 100 may permit one or more NFT transactions of the user 402, a cloud storage system 406, companies and institutions 408, merchants and retailers 410, financial institutions 412, and other users 414. The system 100 facilitates interactions with one or more NFTs 147, which may be stored in the system 100, identified via the system 100, accessed via the system 100, and/or authenticated by the system 100.

In some embodiments, the NFT system 100 may facilitate user authentication, which is a technology area that deals with identifying individuals in a system (such as a country, a network, or an enterprise) and controlling access to resources, such as managed NFTs 147, within that system by associating user rights and restrictions with user-associated NFTs and permitting user transactions with NFTs that are owned by the user or that are permitted by an owner of an NFT, which may be facilitated in the system 100. In general, the NFT system 100 may maintain user information for the user 402, companies and institutions 408, merchants and retailers 410, financial institutions 412, other users 414, and the like. In addition, the system facilitates and maintains NFT identification information and NFT digital data, which can be under user control.

Some of the features that may be provided by the NFT system 100 includes access to NFT transactions from a mobile application, an embedded application operating on the user device, or a web application. In certain embodiments, the NFT system 100 may securely store identity attributes of an NFT 147 on a blockchain.

As provided herein, an NFT 147 is a token used to represent ownership of one or more unique items. Accordingly, the NFT 147 may refer to a blockchain address or hash associated with the NFT 147 that includes a fixed number of alphanumeric characters generated from a public and private key pair. The NFT 147 may also include digital raw or compressed data representative of the NFT 147 and that is associated with a unique blockchain address. As provided herein, the system 100 may store the identifier hash, while the digital data of the NFT 147 is stored elsewhere, e.g., the digital data of the NFT (e.g., the image data, the audio data) is stored off-chain. In embodiments, the system 100 also stores the digital data of the NFT 147. The NFT 147 may also include metadata (e.g., a JSON file) associated with the digital NFT data. Ownership of the NFT 147 may include ownership of hex values encoding transaction elements, such as function names, parameters, and return values, and that are used to access NFT data.

The NFT 147 may, in embodiments, be a type of cryptocurrency that uses smart contracts. However, in contrast to digital coins, which are fungible, each NFT 147 is digitally unique such that no two NFTs 147 are the same. For example, even for items that are multiples of one another (e.g., multiple digital copies of an artwork), each NFT 147 would still have a unique identifier (e.g., a bar code), with only one owner. The intended scarcity of the NFT 147 is set by the creator. A creator may intend to make each NFT 147 completely unique to create scarcity or produce several thousand replicas (each replica having its own unique, non-fungible identifier, similar to an artist print marked as 1/10). Every NFT 147 has an owner of public record that can be verified. In embodiments, NFT creators can retain ownership rights over their own work, and claim resale royalties directly. Thus, the owner of the NFT 147 may have financial arrangements or royalty arrangements that are dictated within the smart contracts of the NFT record.

Creation or minting of an NFT 147 involves confirmation of the NFT 147 as an asset on the blockchain, and the owner's account balance is updated to include that asset. This makes it possible for the NFT 147 to then be traded or verifiably owned. The transactions that confirm the above are added to a block on the chain. The block is confirmed by everyone in the network as correct. This consensus removes the need for intermediaries because the network verifies the NFT 147 and ownership. As provided herein, the NFT 147 may be created on the Ethereum blockchain. In an embodiment, the NFT 147 is part of the ERC-721, ERC-1155, and/or EIP-2309 standard.

The NFT system 100 may employ a blockchain infrastructure to perform NFT management utilized in connection with digital transactions such as NFT minting (e.g., NFT creation), authentication, storage, or financial transactions (e.g., NFT purchasing or exchange, valuation, insurance). In general, blockchains are continuously growing lists of records (e.g., blocks), which are linked and secured using cryptography, for example. By using a blockchain infrastructure that enables the functionality of smart contracts, the methods and systems described herein allow a persistent, replicated, public, and automated database for transactions that involve NFTs.

As such, the embodiments described herein include methods and systems for deployment, maintenance, and interaction with the distributed ledgers and smart contracts to facilitate NFT management for the purpose of performing digital transactions (e.g., financial transactions, exchanges of information). The embodiments described herein may include blockchain techniques, as well as the terminals and servers that operate blockchain nodes, as described herein. Technical advantages of the embodiments described herein also include the use of public and/or private blockchains to perform automated, trusted operations for the purpose of conducting digital transactions involving NFTs 147. The systems described herein allow the performed operations to be transparent and tamper-proof and, thus, may increase the accuracy of, and security with, conducting digital transactions. Moreover, the techniques described herein may also reduce network congestion by, for example, reducing the amount of data transferred between entities that communicate using a network or between two different portions of one entity communicating using a network.

Referring again to FIG. 4, in certain embodiments, the blockchain 420 may be a public or private ledger of all transactions that have been executed in one or more contexts (e.g., negotiable instrument transactions, digital currency transactions, access determinations, instances of providing access, reviews, etc.). The blockchain 420 may grow as completed blocks are added with a new set of transactions by the NFT system 100. In certain embodiments, a single block is provided from multiple transactions (e.g., multiple statements of authenticity for the NFT 147). In general, blocks are added to the blockchain 420 in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain 420, which is automatically downloaded to the node upon joining the peer-to-peer network. The blockchain protocol provides a secure and reliable method of updating the blockchain 420, copies of which are distributed across the peer-to-peer network, without use of a central authority.

The infrastructure described above may be accessed by an application program interface (API). The API may be accessed from an access node. The API may provide users with an interface to the NFTs 147. The API may be loaded as an interface in an access node, or a resource available on the internet that may be accessed using a network application (e.g., a browser) in the access node of the system 100. The API may convert the state and the functions of an online NFT transaction to binary code for storage and execution by miners of the blockchain 420. The API may also convert (e.g., compile) transactions or information requests to a binary message that may be transmitted to the blockchain 420 for execution by miners.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a particular transaction. The blockchain 420 enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain 420). In certain embodiments, the blockchain 420 may also employ other protocols. In this context, the work is a task that is difficult for any single node (e.g., computing device) in the peer-to-peer network to quickly complete, but is relatively easy for a node (e.g., computing device) to verify.

The peer-to-peer network includes miners (e.g., computing devices) that add blocks to the blockchain 420 based on the blockchain protocol. In general, multiple miners validate transactions that are to be added to a block, and compete (e.g., perform work, as introduced above) to have their block added to the blockchain 420. Validation of transactions includes verifying digital signatures associated with respective transactions. For a block to be added to the blockchain 420, a miner must demonstrate a proof of work before their proposed block of transactions is accepted by the peer-to-peer network, and is added to the blockchain 420. In certain embodiments, the blockchain protocol includes a proof of work scheme that is based on a cryptographic hash function (CHF). In general, the CHF receives information as input, and provides a hash value as output, the hash value being of a predetermined length. In certain embodiments, the hash value is a one-way hash value, in that the hash value cannot be "un-hashed" to determine what the input was. In certain embodiments, the blockchain protocol may require multiple pieces of information as input to the CHF. For example, the input to the CHF may include a reference to the previous (most recent) block in the blockchain 420, details of the transaction(s) that are to be included in the to-be-created block, and a nonce value (e.g., a random number used only once).

Multiple nodes may compete to hash a set of transactions and provide the next block that is to be added to the blockchain 420. In certain embodiments, the blockchain protocol provides a threshold hash to qualify a block to be added to the blockchain 420. For example, the threshold hash may include a predefined number of zeros (0s) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain 420. Each miner provides the reference to the previous (most recent) block in the blockchain 420, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain 420. Consequently, the respective miner's block is broadcast across the peer-to-peer network. All other miners cease work (because one miner was already successful), and all copies of the blockchain 420 are updated across the peer-to-peer network to append the block to the blockchain 420. Each miner may be required to produce hundreds or thousands of hash values, before any one miner provides a qualifying hash value (e.g., at least the first four characters of the hash value are each zero).

In certain embodiments, the distributed ledger (or blockchain 420) system may include one or more sidechains. A sidechain may be described as a blockchain 420 that validates data from other blockchains 420. In certain embodiments, a sidechain enables ledger assets (e.g., a digital currency) to be transferred between multiple blockchains 120. In certain embodiments, the blockchain 420 may be a public blockchain, such that data stored on the blockchain 420 is generally accessible. In other embodiments, the blockchain 420 may be a private blockchain, such that the stored data is accessible only to authorized individuals and/or processes on the blockchain 420. In certain embodiments, the blockchain 420 may also be a hybrid of public and private blockchains. For example, the NFT system 100 may utilize a privately managed, but publicly readable blockchain 420. In this manner, some identity information about a user may be stored in a sidechain. In certain embodiments, the NFT system 100 may store multiple different NFTs 147 associated with respective different users 102.

Figure 5:
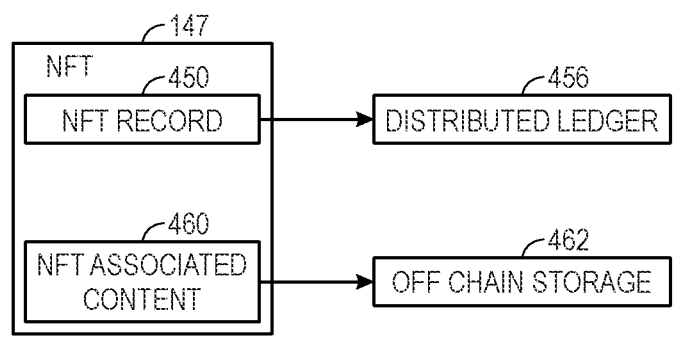
FIG. 5 is a block diagram of a non-fungible token storage arrangement, in accordance with an embodiment.

FIG. 5 shows an example NFT 147 and storage arrangement that includes an NFT record 450, e.g., a token, such as a hash, that is stored and validated in a distributed ledger 456, e.g., a blockchain record. The NFT record 450 includes ownership information and transaction histories. The NFT record 450, as discussed herein, includes a unique identification that uniquely identifies NFT associated content 460, which can be one or more files that includes the digital data of the NFT 147, such as image files, video files, audio files, game item files, or any suitable NFT associated content 460. The NFY associated content 460 may include metadata. While the NFT record 150 is stored in the distributed ledger 456, e.g., a blockchain, storing the NFT associated content 460 in a distributed ledger format may be prohibitively expensive, particularly for larger files. Accordingly, NFT associated content 460 can be stored in an off-chain storage 462. The location of the off-chain storage 462 at the time the NFT 147 was minted can be specifically referred to in the NFT record 450. For example, the NFT record 450 can include a url link to the NFT associated content 460.

In certain embodiments, the NFT 147 may include seed information that populates variables for a fixed NFT generation algorithm, e.g., an image or audio generation algorithm. Each seed can be a hexadecimal string generated in a random or pseudorandom manner at the time the token is minted. However, the algorithm is fixed, such that using a specific seed provides identical result each time. In embodiments, the seed can be stored as part of the NFT record 450 on the distributed ledger 456. The algorithm can be stored as part of the NFT record 450 and/or stored in off-chain storage 462. In this manner, the NFT associated content 460 can be generated on demand using the algorithm and the seed. This may permit greater on-chain storage capabilities, without requiring storage of large data files that are expensive to mint. The seed, and algorithm in embodiments, can be relatively small and inexpensive to record in the distributed ledger 456.

Off-chain storage 462 solutions are typically set by the minter of the NFT 147, and can vary in quality and security. For example, the off-chain storage can be a website, and the NFT record 450 can refer to an HTTP address. However, website access can be shut down if the account holder abandons the site. Further, the owner of the website can alter or replace the original NFT associated content 460. Other storage solutions may be longer-term or more stable, such as storage in InterPlanetary File System (IPFS) or Arweave. In IPFS storage, any added file is given its own unique identifier that acts as a permanent record of the file. Therefore, NFT associated content 460 stored off-chain in an IPFS storage may have a unique token identifier as part of the NFT record 450 and may also have a storage record, such as a content identifier (CID), as part of the stored file in the off-chain storage 462. Accordingly, different NFTs 147 may have different data persistence or mutability based on the quality of the off-chain storage 462.

The NFT purchaser may wish to store the NFT 147 privately to create scarcity of the NFT associated content 460. In an embodiment, the NFT system 100 can include off-chain storage 462 with controlled or user-set access for managed NFTs 147. Thus, the NFT system 100 addresses uncertainties caused by an unsecured link between the NFT record 450 and the NFT associated content 460.

Further, the purchaser of the NFT 147 may be at arms length from the original creator (minter) of the NFT 147 and may not have any way of contacting the creator to alter the storage arrangements or authenticate the NFT associated content 460. Disclosed embodiments of the NFT system 100 include improved authentication of the NFT associated content 460 for downstream purchasers of the NFT 147, which in turn may permit controlled storage of an authenticated copy of the NFT associated content 460. A user of the NFT system 100 may wish to control storage of a purchased NFT 147 or have access to an authenticated copy of the associated content 160 that is stored in a secure storage location.

Figure 6:
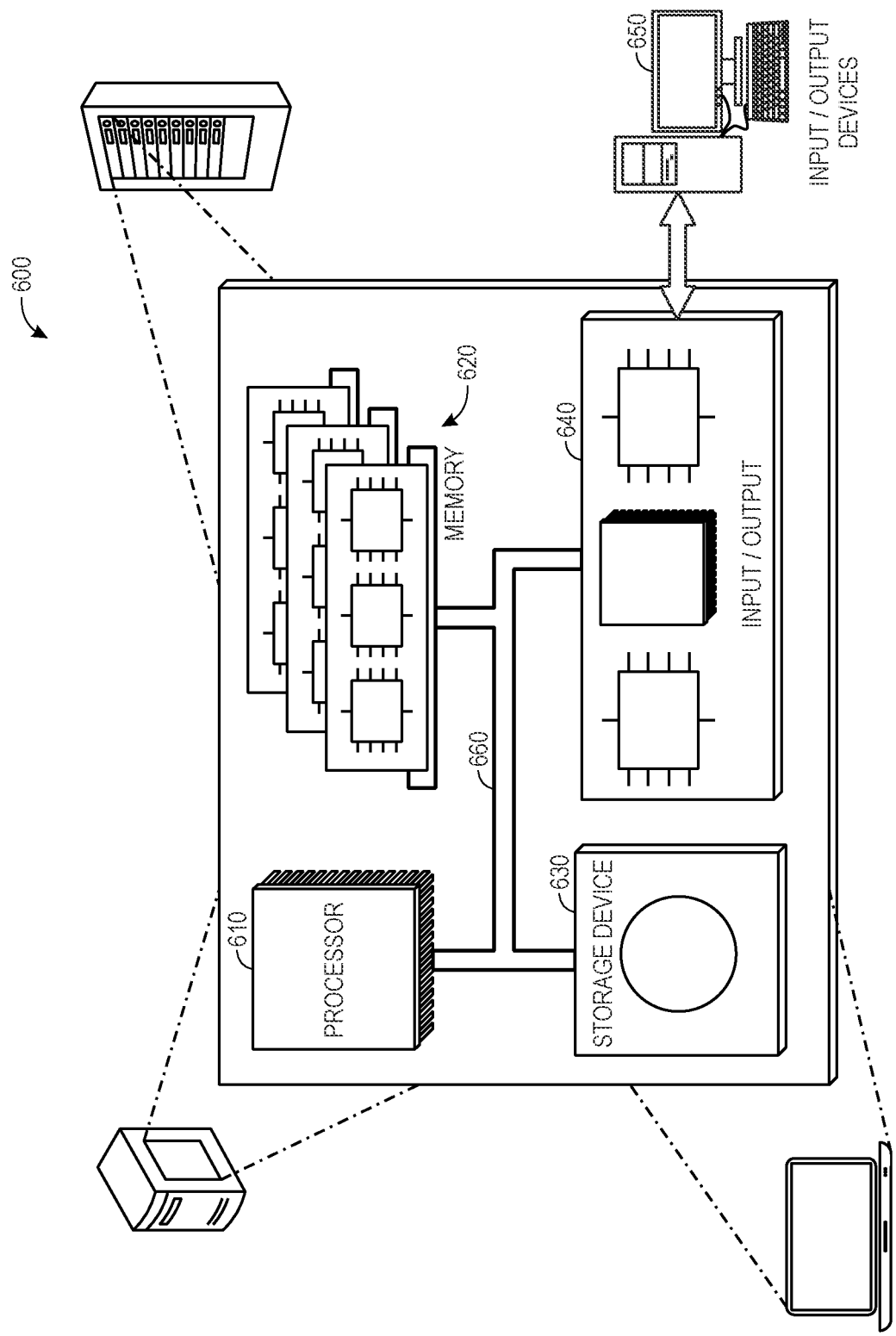
FIG. 6 is a schematic illustration of an example computing system, in in accordance with an embodiment.

FIG. 6 illustrates an example computing system 600 that the embodiments described herein may use to perform their respective operations. The system 600 may be used for any of the operations described with respect to the various embodiments described herein, including the NFT system 100 described herein. For example, the system 600 may be included, at least in part, in one or more of computing device(s) or system(s) described herein. In certain embodiments, the system 600 may include one or more processors 610, one or more memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

In certain embodiments, the processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 may execute instructions for the various software module(s) described herein. The processor(s) 610 may include hardware-based processor(s) each including one or more cores. The processor(s) 610 may include general purpose processor(s), special purpose processor(s), or both.

In certain embodiments, the memory 620 may store information within the system 600. In certain embodiments, the memory 620 includes one or more computer-readable media. The memory 620 may include any number of volatile memory units, any number of non-volatile memory units, or both volatile and non-volatile memory units. The memory 620 may include read-only memory, random access memory, or both. In certain embodiments, the memory 620 may be employed as active or physical memory by one or more executing software modules.

In certain embodiments, the storage device(s) 630 may be configured to provide (e.g., persistent) mass storage for the system 600. In certain embodiments, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In certain embodiments, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 610 and the memory 620 may be supplemented by, or incorporated into, one or more application-specific integrated circuits (ASICs).

In certain embodiments, the system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600 or may be external on one or more computing devices of the system 600.

In certain embodiments, the system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-832 standard for serial ports, or with a version of the IEEE AA884 standard for parallel ports. As another example, the I/O interface(s) 640 may be configured to provide a connection over Universal Serial Bus (USB) or Ethernet. In certain embodiments, the I/O interface(s) 640 may be configured to provide a serial connection that is compliant with a version of the IEEE AA994 standard.

In certain embodiments, the I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments of the system 600 may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 600 that includes a back-end component, e.g., as a data server, or that includes a middleware component, e.g., an application server, or that includes a front-end component, e.g., a client computer having a graphical user interface or a web browser through which a user may interact with an with the system 600, or any appropriate combination of one or more such back-end, middleware, or front end components. The components of the system 600 may be interconnected by any appropriate form or medium of digital data communication, e.g., a communication network. Examples of communication networks include a local area network ("LAN") and a wide area network ("WAN"), e.g., the Internet.

In certain embodiments, the computing system 600 may include clients and servers. A client and server are generally remote from each other and typically interact through a communication network. The relationship of client and server arises by computer programs running on the respective computers and having a client-server relationship to each other.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to their information and/or constraints on such access. The interface may also enable the user to view information such as transaction history that is stored on the distributed ledger. In certain embodiments, a history may provide an auditable history of transactions, which are mediated by the smart contract(s) on the distributed ledger. Additionally, it should be noted that the smart contract(s) executing on a distributed ledger may make access authorization decisions based on permission information stored on the distributed ledger. In certain embodiments, the distributed ledger may be a blockchain, such as blockchain 420.

Embodiments of the present disclosure are also directed to secure device management. More particularly, embodiments of the present disclosure are directed to managing a network of devices using information and/or computer programming code on a distributed ledger system such as a blockchain. The computer programming code may include smart contracts, which may also be described as self-executing contracts, blockchain contracts, digital contracts, and/or chain code. As used herein, a smart contract refers to computer programming code executed by a distributed ledger system. For instance, smart contracts may refer to distributed programs, or distributed applications that can be used to perform the transactions and recordation in the blockchain infrastructure. Smart contracts may include data structures that may keep track of the state of the smart contract, as well as smart contract functions to interact with the smart contract. As the interactions with the smart contracts may only take place through the smart contract functions, the integrity of the state of the smart contract may be preserved. For example, smart contracts may be utilized in the exchange of information regarding users. As another example, smart contracts may be utilized in conjunction with financial transactions, such as payments or loans.

While only certain features of the disclosed embodiments have been illustrated and specifically described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A three-dimensional (3D) printing system for printing 3D structures, comprising:
   an extruder configured to layer material along a surface during a printing process; and
   a processor configured to:
      receive an identifier from a device;
      receive a non-fungible token (NFT), wherein the NFT includes a blueprint of a structure;
      query a blockchain to confirm the NFT has an association with the identifier that indicates the device is authorized to use the blueprint;
      receive location-based data corresponding to a received location for a physical structure;
      edit the blueprint based on the location-based data; and
      in response to determining that the device is authorized to use the blueprint, cause the extruder to print the physical structure based on the edited blueprint.

2. The system of claim 1, wherein the location-based data comprises dimensions of the received location and climate information of the received location.

3. The system of claim 2, wherein editing the blueprint based on the location-based data comprises changing a wall thickness for a wall defined by the blueprint based on the climate information of the received location.

4. The system of claim 1, wherein the identifier is an encrypted password.

5. The system of claim 1, wherein the identifier is an image of an identification (ID) card.

6. The system of claim 1, wherein the identifier is an identification (ID) number corresponding to an ID card.

7. The system of claim 1, wherein the identifier is a separate NFT comprising data indicating that an owner of the NFT gives the user permission to print the structure.

8. The system of claim 1, wherein the processor is configured to:
   in response to determining that the device is not authorized to use the blueprint, prevent the extruder from printing a structure based on the blueprint.

9. The system of claim 8, wherein preventing the extruder from printing the structure based on the blueprint comprises deactivating the extruder for a period of time.

10. A method, comprising:
    receiving, via a controller, an identifier from a device, wherein the device is associated with a 3D printing apparatus, and wherein the identifier comprises data authorizing a 3D printing operation;

receiving, via the controller, a non-fungible token (NFT), wherein the NFT includes a blueprint of a physical structure;

querying, via the controller, a blockchain to confirm the NFT has an association with the identifier that indicates the device is authorized to use the blueprint;

receiving, via the controller, location-based data corresponding to a received location for the physical structure;

editing, via the controller, the blueprint based on a correlation between the location-based data and structural characteristics; and in response to determining that the device is authorized to use the blueprint, causing, via the controller, the 3D printing apparatus to print the physical structure based on the edited blueprint.

11. The method of claim 10, wherein the data of the identifier comprises an indication that a user is authorized to 3D print the structure.

12. The method of claim 10, wherein the data of the identifier comprises an indication that the 3D printing apparatus is authorized to 3D print the physical structure.

13. The method of claim 10, comprising:

receiving, via the controller, a second identifier from the device; and querying, via the controller, the blockchain to confirm the NFT does not have an association with the second identifier that indicates the device is authorized to use the blueprint.

14. The method of claim 13, comprising:

in response to determining that the device is not authorized to use the blueprint, preventing, via the controller, the 3D printing apparatus from printing the physical structure based on the blueprint.

15. A tangible, non-transitory, computer-readable medium, comprising computer-readable instructions that, when executed by one or more processors, cause the one or more processors to:

receive an identifier from a device, wherein the device is associated with a 3D printing apparatus, and wherein the identifier comprises data authorizing a 3D printing operation;

receive a non-fungible token (NFT), wherein the NFT includes a blueprint of a structure;

query a blockchain to confirm the NFT has an association with the identifier that indicates the device is authorized to use the blueprint;

receive location-based data corresponding to a received location for a physical structure; and edit the blueprint based on a correlation between the location-based data and building characteristics; and in response to determining that the device is authorized to use the blueprint, cause the 3D printing apparatus to print the physical structure based on the edited blueprint.

16. The computer-readable medium of claim 15, comprising computer-readable instructions that, when executed by the one or more processors, cause the one or more processors to:

query the blockchain to confirm the NFT does not have an association with the identifier that indicates the device is authorized to use the blueprint; and in response to determining that the device is not authorized to use the blueprint, prevent the 3D printing apparatus from printing the physical structure based on the blueprint.

17. The computer-readable medium of claim 15, wherein the identifier is received from a software wallet.

* * * * *